H. W. OSTER.
NIPPLE THREADING MECHANISM.
APPLICATION FILED SEPT. 7, 1909.

948,793.

Patented Feb. 8, 1910.

2 SHEETS—SHEET 1.

Witnesses.
E. B. Gilchrist
G. C. Phillips

Inventor.
Herman W. Oster
By Thurston & Woodward
Attorneys

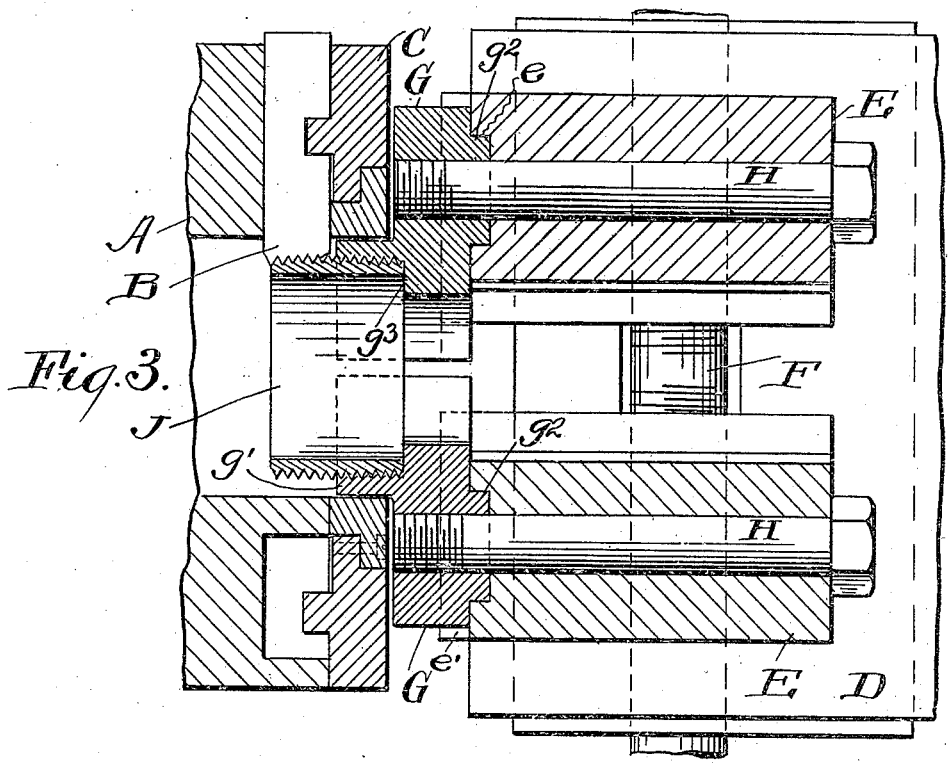
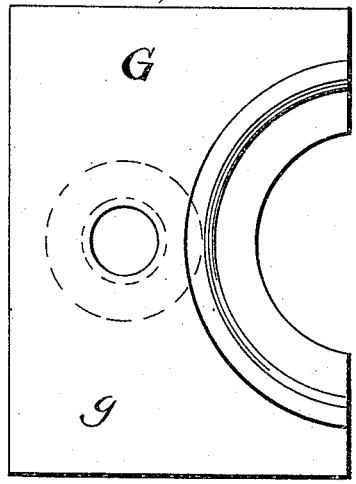
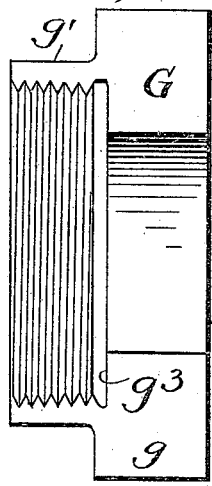
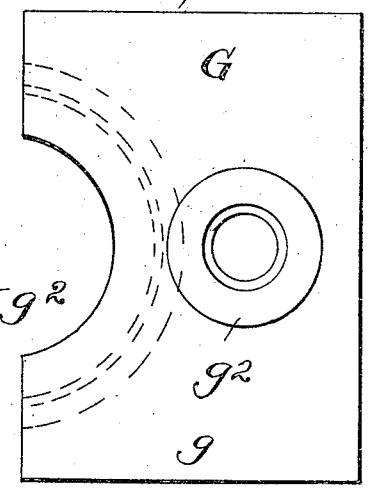

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

NIPPLE-THREADING MECHANISM.

948,793.  Specification of Letters Patent.  Patented Feb. 8, 1910.

Application filed September 7, 1909. Serial No. 516,371.

*To all whom it may concern:*

Be it known that I, HERMAN W. OSTER, a citizen of the United States, residing at Cleveland, in the county of Cuyahoga and State of Ohio, have invented a certain new and useful Improvement in Nipple-Threading Mechanism, of which the following is a full, clear, and exact description.

This invention relates to means for threading nipples,—that is to say, the short sections of pipe having at both ends external slightly tapered threads.

The invention resides in the nipple holding jaws shown, and in the described combination of such jaws with a machine adapted for cutting tapered threads.

The invention is hereinafter described and definitely set forth in the claims, and illustrated in the accompanying drawings, in which—

Figure 1:
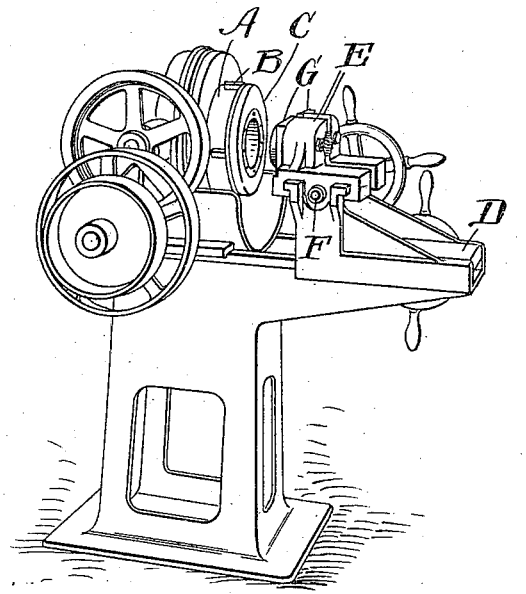
Figure 2:
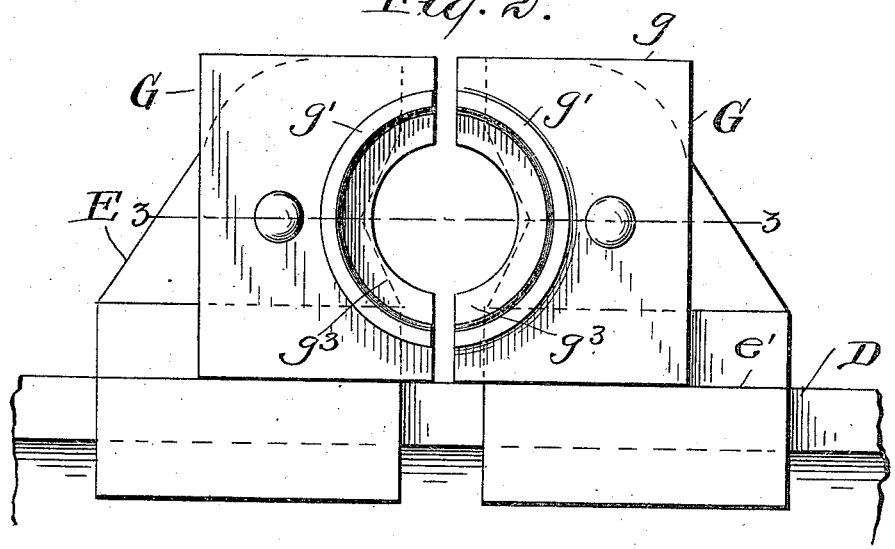

Figure 1 is a perspective view of a machine embodying the invention. Fig. 2 is a front elevation of the nipple holding devices. Fig. 3 is a horizontal section through the nipple holding mechanism and through the rear end of the head,—the section being in the plane indicated by line 3—3 on Fig. 2. Fig. 4 is a front view, Fig. 5 an inner side view, and Fig. 6 a rear view of one of the nipple holding jaws.

The thread cutting mechanism shown is of well known construction. It includes a rotatable tubular head A; thread cutting chasers B which are carried by and are movable radially upon said head toward and from its axis; and a cam plate C mounted on the head and adapted to turn about the axis thereof and to engage with and move the chasers inward or outward. The machine also contains a pair of vise jaws E adapted to grasp and hold a piece of pipe while it is being threaded. These jaws are mounted on a slide D which is movable in a path parallel with the axis of the head. The vise jaws are movable on this slide horizontally toward and from each other and the axis of said head. A right and left feed screw F may be mounted on the slide for so moving said vise jaws.

The machine shown, in respect to the parts above mentioned, is well known in the art, and therefore requires no more detailed description. The cutting ends of the chasers may be formed so as to cut tapered threads; or the cam plate may be turned on the head while the latter is turning so that the threads cut will be tapered. The construction and mode of operation above mentioned are old and well known.

The nipple holding jaws G, which will now be described, and their combination with said machine constitute the novel feature of the invention as defined by the claims. These two jaws are removably secured to the front faces of the two vise jaws respectively. Each nipple jaw has a back plate $g$, and a forwardly projecting approximately semi-cylindrical flange $g'$ which is internally threaded. On the rear side of the back plate is a boss $g^2$ which is to be put into a countersunk recess $e$ in the front face of the associated vise jaw. A bolt H passes through a hole in the vise jaw and into a threaded hole $g^4$ of the nipple jaw. When the boss $g^2$ is in the recess $e$, and when the lower edge of the nipple jaw is engaging with a forwardly projecting flange $e'$ on the vise jaw, the bolt H is tightened up and the nipple jaw is thereby immovably fixed to the vise jaw in proper relation thereto and to the head. When both nipple jaws are so secured to the vise jaws, the two flanges $g'$ form a substantially semi-cylindrical clamp which is internally threaded and thereby adapted to grasp the threaded end of a short pipe section or nipple K; and the external diameter of this cylindrical clamp made up of the two flanges $g'$ is less than the internal diameter of the rear end of the chaser carrying head A. On each nipple jaw is a flange $g^3$ which extends into and partly across the space between the two flanges $g'$; the rear end of the nipple K in the grip of said jaws should engage with the flanges $g^3$.

To use the machine described for making threaded nipples, a pipe, held in the vise jaws, is threaded by the chasers carried by the head, said thread extending as far back from the end of the pipe as desired. The chasers should be constructed or manipulated so that this thread will be slightly tapered. After this thread is cut, the threaded portion and a required length of unthreaded pipe is cut off. Nipple jaws G, G of the size corresponding with the threaded end of said nipple are secured to the vise jaws as stated. Then the threaded end of said nipple is put into the recess between the flanges $g'$ so that when the vise jaws are moved toward each other the threaded nipple or pipe section will be gripped. Then the slide D is moved toward the head, and thereby the unthreaded end of the nipple is presented to the action of the chasers. When these begin to cut their threads they will or may cause the nipple to turn in the threaded jaws until the end of the nipple is brought against the flanges $g^3$ which prevents further turning. As the slide D is advanced a tapered thread is cut on the nipple. The fact that the external diameter of the clamp composed of the two flanges $g^3$ is less than the internal diameter of the head, permits these flanges to enter the head and carry the nipple along so that the chasers may cut a thread thereon right up to the ends of said flanges. The threads so cut, if the dies are properly shaped or manipulated, will be tapered and thereby there will be produced a nipple threaded at and tapered from both ends. The threads may even be continuous from end to end.

Having described my invention, I claim:

1. In a thread cutting machine, the combination with the tubular rotatable chaser-carrying head, of two vise jaws, and means for moving them simultaneously toward and from each other and the axis of said head, with two nipple jaws respectively secured against the front faces of said two vise jaws, each nipple jaw having a forwardly projecting approximately semi-cylindrical flange which is internally threaded, the diameter of said flanges being such that when they are closed in upon a nipple they can enter the tubular center of said head.

2. In a thread cutting machine, the combination with two vise jaws and means for moving them simultaneously toward and from each other, of two nipple jaws secured respectively to the front faces of said vise jaws, each of said nipple jaws comprising a back plate adapted to be secured to the vise jaws, and a forwardly extended approximately semi-cylindrical flange which is internally threaded.

3. In a thread cutting machine, the combination with two vise jaws and means for moving them simultaneously toward and from each other, of two nipple jaws secured respectively to the front faces of said vise jaws, each of said nipple jaws comprising a back plate adapted to be secured to the vise jaws, and a forwardly extended approximately semi-cylindrical flange which is internally threaded, each of said nipple jaws having a flange extending inward into the space between said semi-cylindrical flanges and at the rear ends thereof.

4. The combination of two vise jaws each having a forwardly projecting flange, means for moving said vise jaws simultaneously toward and from each other, with two nipple jaws secured respectively to the front faces of said vise jaws, each nipple jaw having a back plate which is secured to the vise jaw and whose lower end engages with the flange on said vise jaw, and which has also a forwardly projecting approximately semi-cylindrical flange which is internally threaded.

5. The combination of two vise jaws each having a forwardly projecting flange, a hole through it from front to back and a counter recess in its front face around said hole, with two nipple jaws each of which has (1) a threaded hole, (2) a boss on its rear face around said hole which fits into the recess in the corresponding vise jaw, (3) a forwardly projecting approximately semi-cylindrical flange which is internally threaded, and (4) an inwardly extended flange at the rear end of said threaded flange.

In testimony whereof, I hereunto affix my signature in the presence of two witnesses.

HERMAN W. OSTER.

Witnesses:
CARY R. ALBURN,
E. L. THURSTON.